(12) United States Patent
Laturell

(10) Patent No.: US 6,845,156 B1
(45) Date of Patent: Jan. 18, 2005

(54) SYSTEM FOR REDUCING DISTORTION IN A LINE POWERED MODULATOR

(75) Inventor: Donald Raymond Laturell, Allentown, PA (US)

(73) Assignee: Agere Systems, Inc., Allentown, PA (US)

(*) Notice: Subject to any disclaimer, the term of this patent is extended or adjusted under 35 U.S.C. 154(b) by 0 days.

(21) Appl. No.: 09/515,911

(22) Filed: Feb. 29, 2000

(51) Int. Cl.[7] ............................. H04M 1/00; H04M 9/00
(52) U.S. Cl. .............................. 379/399.01; 379/93.05; 379/93.36; 379/412.02
(58) Field of Search .......................... 379/78–82, 93.25, 379/93.31, 93.36, 169, 186, 322, 323, 324, 394, 395, 399.01, 401, 404, 413.02, 413.04, 93.05, 413

(56) References Cited

U.S. PATENT DOCUMENTS

| | | | | |
|---|---|---|---|---|
| 5,451,923 A | * | 9/1995 | Seberger et al. | 340/310.06 |
| 5,809,068 A | * | 9/1998 | Johnson | 375/222 |
| 6,169,762 B1 | * | 1/2001 | Embree et al. | 375/220 |
| 6,212,226 B1 | * | 4/2001 | Newton | 375/222 |
| 6,421,430 B1 | * | 7/2002 | Hollenbach et al. | 379/93.36 |
| 6,661,892 B1 | * | 12/2003 | Fischer | 379/391 |
| 6,728,371 B1 | * | 4/2004 | Fischer et al. | 379/399.01 |
| 6,731,728 B2 | * | 5/2004 | Hollenbach et al. | 379/93.36 |
| 6,744,888 B1 | * | 6/2004 | El-Kik et al. | 379/412 |
| 6,763,107 B1 | * | 7/2004 | Fischer et al. | 379/399.01 |

\* cited by examiner

*Primary Examiner*—Binh Tieu

(57) ABSTRACT

A method and apparatus for a telephone line interface or data access arrangement (DAA) which includes a shunt regulator in series with a line modulator and a sense resistor. A shunt regulator is placed in series between the sense resistor and the line modulator. The shunt regulator draws power from the telephone line, and the sense resistor senses the amount of current being drawn. The voltage across the sense resistor is fed back to the line modulator. The line modulator is thus capable of adjusting the AC modulation and the DC termination presented to the telephone line based upon the sensed current draw from the telephone line. The telephone line interface can also place an information signal on the telephone line. The method of placing the information signal on the telephone line includes sensing the current draw from the telephone line with a sense resistor, drawing current from the telephone line and through the sense resistor with the shunt regulator, and modulating the output signal from the shunt regulator based on the information signal.

19 Claims, 6 Drawing Sheets

SYSTEM FOR REDUCING DISTORTION IN A LINE POWERED MODULATOR

FIELD OF THE INVENTION

This invention relates to a low noise telephone line interface for data access arrangements (DAA). Specifically, it relates to a low distortion line powered DAA having improved linearity and accuracy.

BACKGROUND OF THE INVENTION

The telephone lines to a residence in the United States and elsewhere can have common mode voltages of over 100V, and the FCC requires the telephone lines to be isolated from any electric main powered device (such as a PC) connected to the telephone lines (through a modem for example) to prevent damage to the telephone network. 47 CFR 68.302,4 (Oct. 1, 1997 Edition). A data access arrangement (DAA) is specified by the FCC to isolate the telephone lines from electric main powered devices, such as illustrated in FIG. 3. Since the voice band modem signal is limited to the 100 to 3600 Hz band, a DAA can be constructed using a transformer which operates as a bandpass filter to isolate the electric main powered device from the telephone lines.

A smaller size and potentially lower cost solution uses active circuits to communicate with the central telephone offices and various modulation techniques to couple the DAA through small capacitors to the PC.

FIG. 4 shows a known line powered telephone line interface circuit for modulating a data signal onto a telephone line using active circuits. The circuit of FIG. 4 is disclosed and described fully in U.S. patent application Ser. No. 09/028,061 filed on Feb. 26, 1998, entitled Low Noise Line Powered DAA With Feedback, assigned to the same assignee as the present application, and incorporated herein by reference. The circuit is designed in low voltage CMOS technology and can handle only a small amount of voltage. The main function of the circuit is to take the incoming current $I_{LINE}$ supplied by the telephone company and modulate it with a data signal developed by processing a differential data source signal $V_D$ with a line modulator so as to place the data signal on the telephone line. The circuit uses transistor $Q_1$ as a line modulator, and contains a shunt regulator in series with the line modulator $Q_1$. A sense resistor $R_{S1}$ is placed in series between the line modulator $Q_1$ and the shunt regulator to monitor the current through the shunt regulator.

The circuit depicted in FIG. 4 works by monitoring the current through sense resistor $R_{S1}$ with a feedback loop around the amplifier A. Resistors $R_{T1}$ and $R_{B1}$ sense the differential voltage across $R_{S1}$. By setting $R_{T1}=R_{B1}$, the current through $R_{T1}$ and $R_{B1}$ will accurately model the current through $R_{S1}$. The desired signal to be modulated is introduced by a differential data source signal $V_D$. The differential signal is created by adding signal $V_D/2$ to $V_{CM}$ to create $V_P$ and subtracting $V_D/2$ from $V_{CM}$ to create $V_N$. This differential signal then drives the input resistors $R_{IP}$ and $R_{IN}$ to provide a differential signal input current. The generation of the differential signal current is well known in the art and will not be further discussed herein. The control amplifier operates to force the current through resistor $R_{S1}$ to equal the desired signal current by regulating transistor $Q_2$ to control the base of transistor $Q_1$, which in turn regulates the current through the source-emitter path of transistor $Q_1$ and thereby through resistor $R_{S1}$. In this circuit, the collector current of transistor $Q_1$ is well controlled by the control amplifier A. However, this arrangement incurs a degree of error which is problematic for new communication devices such as high speed data modems. The source of the error is due to current that is outside of the path containing the sense resistor $R_{S1}$. This stray current will be discussed after a brief discussion of FIG. 5.

FIG. 5 depicts an alternative circuit arrangement similar to the circuit depicted in FIG. 4. However, the circuit in FIG. 5 uses the output of amplifier A to control the emitter of transistor $Q_2$, rather than the base of transistor $Q_2$, and thereby the collector current of transistor $Q_1$. As in the circuit depicted in FIG. 5, the collector current of transistor $Q_1$ is well controlled by the control amplifier A. This arrangement also incurs a degree of error which is problematic for new communication devices such as high speed data modems.

The error associated with the previously mentioned circuit designs of FIG. 4 and FIG. 5 will now be discussed. Ideally, the current through $R_{S1}$ would equal the current, $I_{LINE}$, introduced to the system by the telephone company. This would allow amplifier A to take all of $I_{Line}$ into account when modulating the differential signal source onto $I_{Line}$. An error exists in the line modulation devices of FIG. 4 and FIG. 5 due to the inclusion of only part of the total current $I_{LINE}$ through sense resistor $R_{S1}$. In both circuits, the current from the telephone company is introduced to the system through the emitter of transistor $Q_1$ (hereinafter "$I_{E1}$"). In the circuits depicted in FIG. 4 and FIG. 5, $I_{E1}$ is equal to $I_{LINE}$, the resistances of $R_{T1}$ and $R_{B1}$ are two to three hundred thousand ohms, and the resistance of $R_{S1}$ is 10–20 ohms. Because of the relatively high level of resistance of $R_{T1}$ and $R_{B1}$, the current that flows through $R_{T1}$ and $R_{B1}$ can be neglected in the circuit analysis. As current flows through the circuits, $I_{E1}$ is divided into the transistor $Q_1$ base current (hereinafter "$I_{B1}$") and the transistor $Q_1$ collector current (hereinafter "$I_{C1}$"). The collector current $I_{C1}$ through the resistor $R_{S1}$ is used by amplifier A in a feedback loop to modulate the desired signal onto $I_{LINE}$. Since the current $I_{B1}$ is outside the feedback loop, an error term in the amount of $I_{B1}$ is introduced to the circuit, that is, $I_{C1}$ through resistor $R_{S1}$ is not equal to $I_{LINE}$, but is equal to $I_{E1}-I_{B1}$ or $I_{LINE}-I_{B1}$.

An additional problem arises from $I_{B1}$ being outside the amplifier feedback path. Since $I_{C1}$ and $I_{B1}$ are related by the β of $Q_1$, and the β of a transistor is a function of the actual signal level, the error term introduced by not accounting for current $I_{B1}$ in the feedback loop is signal dependent. Signal dependent error terms are a source of harmonic distortion which is problematic for communication devices. In order for current 56 k modems (V.90 standard) to function, a signal to distortion ratio greater than 80 dB is needed. Unfortunately, due to the error term introduced by neglecting $I_{B1}$, the circuits of FIG. 4 and FIG. 5 can provide a signal to distortion ratio of only about 75 dB, even when high quality components are utilized.

One method which has been used to reduce distortion is depicted in FIG. 6. The circuit is disclosed and described fully in U.S. patent application Ser. No. 09/280,473 filed on Mar. 30, 1999, entitled Method and Apparatus for Decreasing Distortion in a Line Powered Modulator Circuit, assigned to the same assignee as the present application, and incorporated herein by reference.

The circuit in FIG. 6 reduces distortion by incorporating a larger portion of $I_{LINE}$ into the feedback path of the control amplifier A. A larger portion of $I_{LINE}$ is incorporated by including a second sense resistor $R_{S2}$ in a second feedback path to amplifier A in order to sense current introduced to the system by $I_{LINE}$ which does not flow through the first sense resistor $R_{S1}$. The operation of the differential signal source and the shunt regulator are similar to the differential signal source and shunt regulator discussed above. In addition, as with $R_{T1}$ and $R_{B1}$, $R_{T2}$ and $R_{B2}$ have a relatively high level of resistance and the current that flows through $R_{T2}$ and $R_{B2}$ can be neglected in the circuit analysis.

In FIG. 6, the output of amplifier A is electrically connected to the emitter of transistor $Q_2$ through the additional sense resistor $R_{S2}$, the collector of transistor $Q_2$ is electrically connected to the base of transistor $Q_1$, and the base of transistor $Q_2$ is electrically connected to the collector of transistor $Q_1$. In this configuration, the original sense resistor current $I_{S1}$ through the primary sense resistor $R_{S1}$ is equal to the transistor $Q_1$ collector current $I_{C1}$ less the transistor $Q_2$ base current $I_{B2}$. Accordingly, the transistor $Q_2$ base current $I_{B2}$ equals the transistor $Q_1$ collector current $I_{C1}$ less the original sense resistor current $I_{S1}$. The current through the additional sense resistor $R_{S2}$ is the transistor $Q_2$ emitter current $I_{E2}$, or equivalently the sum of the transistor $Q_2$ base current $I_{B2}$ and collector current $I_{C2}$. Since the transistor $Q_2$ collector current $I_{C2}$ equals the transistor $Q_1$ base current $I_{B1}$, the current through the additional sense resistor $Q_2$ can also be said to be the sum of the currents $I_{B1}$ and $I_{B2}$. Therefore, the sum of the currents through both sense resistors $R_{S1}$ and $RS_2$ equals $(I_{B1}+I_{B2}+I_{C1}-I_{B2})$, or equivalently $I_{B1}+I_{C1}$, which equals $I_{LINE}$. This arrangement results in a circuit which is virtually free from distortion. The circuit is free from distortion because the first sense resistor $R_{S1}$ senses the current and its associated distortion through the shunt regulator, and the second sense resistor $R_{S2}$ senses all other significant currents and their associated distortion, allowing the amplifier to control $I_{LINE}$ by incorporating all of $I_{LINE}$ in a feedback path.

This method and apparatus for reducing distortion in a line powered DAA requires the amplifier to sense the level of current at multiple locations. Since the level of current through a resistor depends on the resistance of the resistor, the resistors at the various locations must be carefully matched in order to obtain an accurate relationship between $I_{LINE}$ and the current sensed by the amplifier. In addition, the introduction of each additional sense resistor requires the addition of high value resistors such as $R_{T2}$ and $R_{B2}$.

SUMMARY OF THE INVENTION

The present invention provides for a telephone line interface for placing an information signal on a telephone line. The telephone line interface includes a shunt regulator, a sense resistor, and a line modulator. The line modulator is connected in series with the sense resistor and the shunt regulator such that the shunt regulator is operably coupled between the sense resistor and the line modulator. The shunt regulator draws power from the telephone line, and the sense resistor senses the amount of current being drawn from the telephone line. The line modulator modulates the telephone line as a function of the information signal.

Another aspect of the invention provides for a method of placing an information signal on a telephone line. The method includes sensing the current draw from the telephone line with a sense resistor, drawing current from the telephone line and through the sense resistor with a shunt regulator, and modulating the output signal from the shunt regulator based on the information signal.

DETAILED DESCRIPTION OF THE INVENTION

Figure 1:
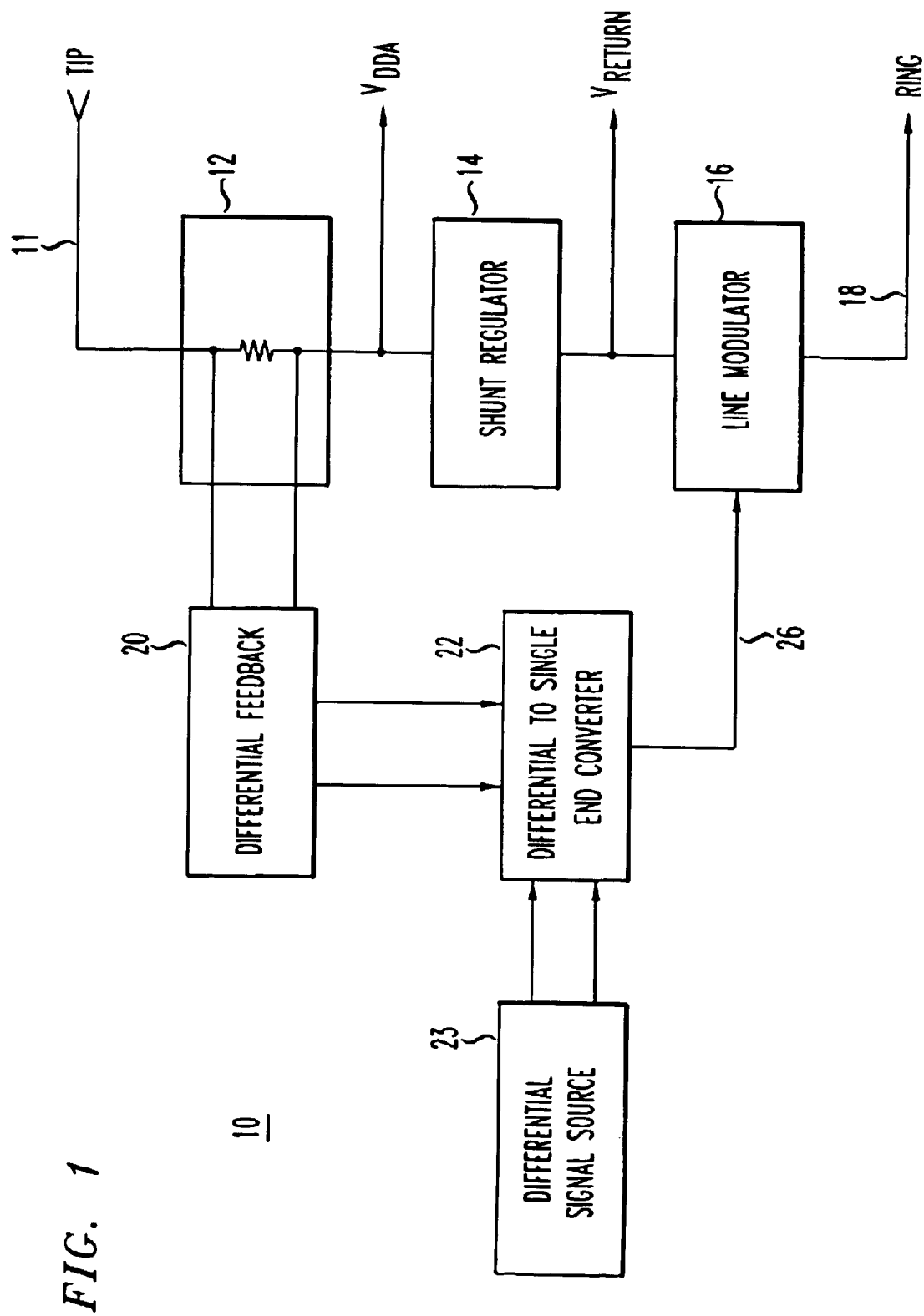
FIG. 1 is a block diagram of a telephone line interface in accordance the present invention.

FIG. 1 illustrates a telephone line interface 10 for placing an information signal on a telephone line 11, 18. The telephone line interface includes a shunt regulator 14, a sense resistor 12, and a line modulator 16. The line modulator 16 is connected in series with the sense resistor 12 and the shunt regulator 14, such that the shunt regulator is operably coupled between the sense resistor 12 and the line modulator 16. The shunt regulator 14 draws power from the telephone line, and the sense resistor 12 senses the amount of current being drawn from the telephone line 11. The line modulator 16 modulates the telephone line return 18 as a function of the information signal. The information signal can be generated at a signal source 23.

The telephone line interface 10 takes the incoming current supplied by the telephone company on telephone line 11 and modulates the telephone line with an information signal from signal source 23. The interface 10 achieves these results by sensing the current draw from the telephone line 11 with a sense resistor 12, drawing current from the telephone line and through the sense resistor with a shunt regulator 14, and modulating the output signal from the shunt regulator. The line modulator 16 modulates the output signal from the shunt regulator based upon the information signal generated at a signal source 23.

With further reference to FIG. 1, the telephone line interface can also include a differential feedback path 20, a differential to single end converter 22, and a differential signal source 23 for generating the information signal. The differential feedback path senses the current through the sense resistor 12 and generates a signal representation of the sensed current. The differential to single end converter 22 then receives the signal from differential feedback 20 and converts the differential signal into a single ended control signal 26. In addition, the differential to single end converter 22 receives input from the signal source 23. The converter 22 can combine the signal from the signal source 23 with the signal from the feedback block 20 to generate a single ended modulator control signal 26 for controlling modulator 16.

The shunt regulator 14 provides power draw from the telephone line for powering the differential to single end converter 22, as well as for powering other modem and/or data processing circuitry. The shunt regulator 14 limits the voltage across system components which are in parallel with the shunt regulator 14 to voltage level $V_{DDA}$. Without the shunt regulator, the voltage difference between the voltage at the telephone line 11 and the voltage at the telephone line 18 can range from 5 to 56 volts. With the shunt regulator 14, the voltage to the circuitry is regulated to a voltage $V_{DDA}$-$V_{Return}$.

Figure 2:
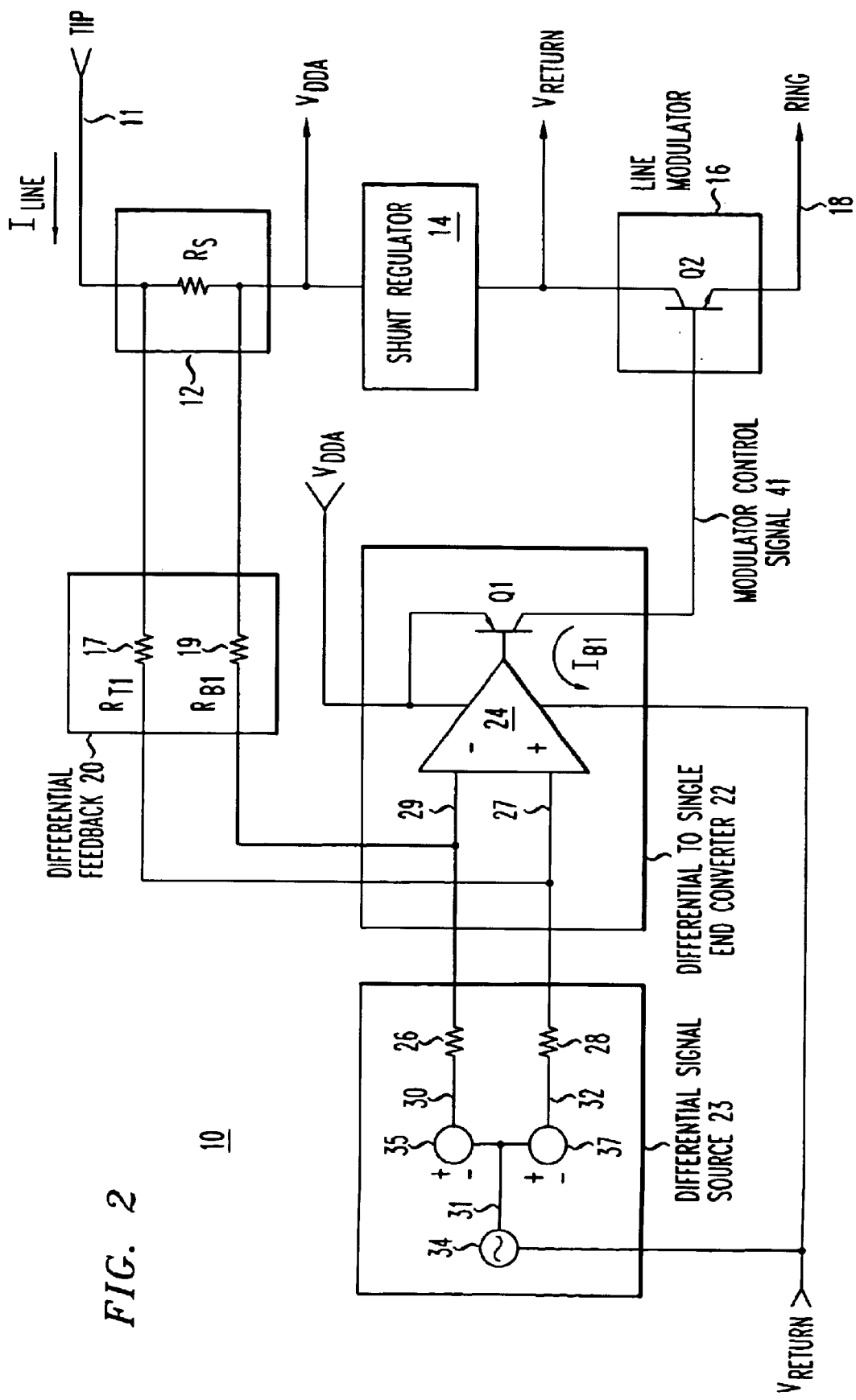
FIG. 2 is a detailed circuit diagram of the invention of FIG. 1.
Figure 3:
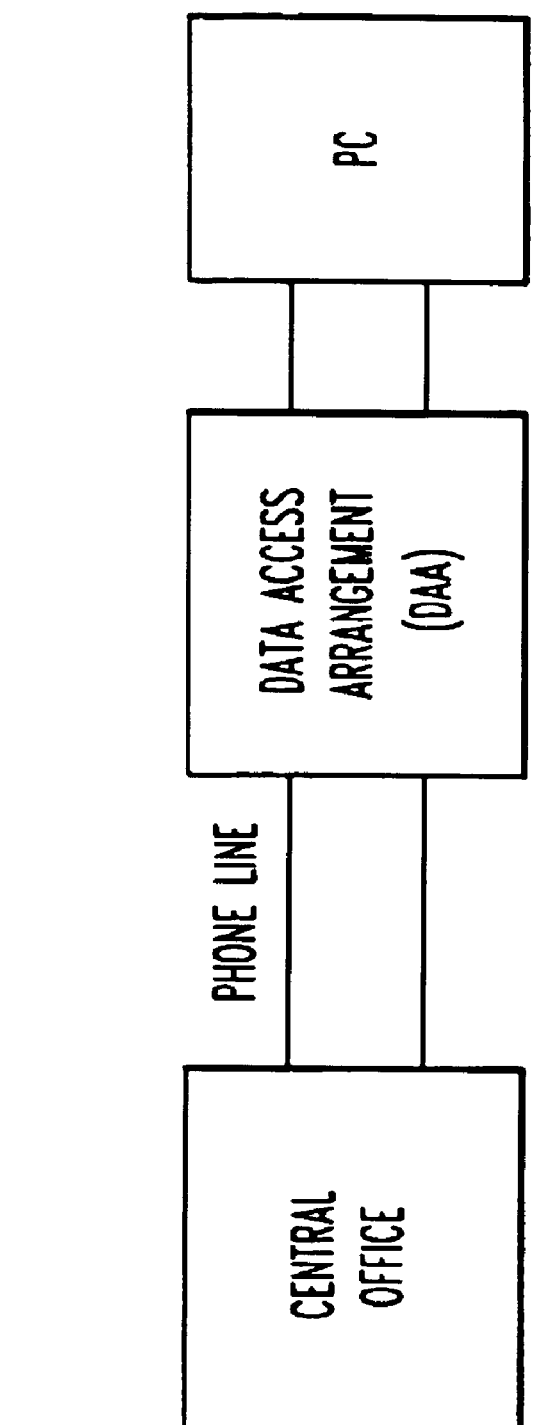
FIG. 3 is a block diagram of a conventional interface between a telephone network and an electric main powered device in accordance with the prior art.
Figure 4:
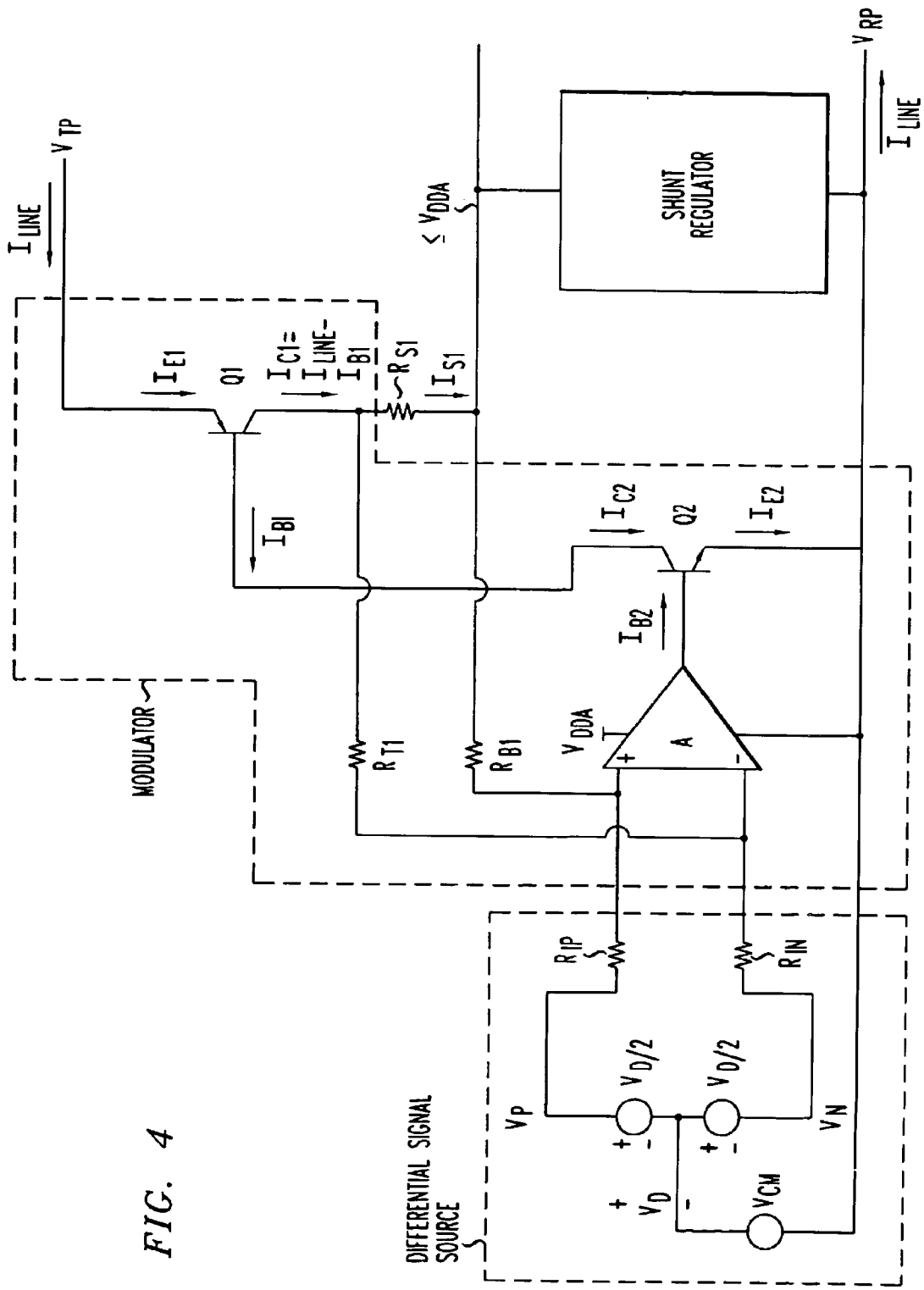
FIG. 4 is a circuit diagram of a data access arrangement (DAA) in accordance with known art.
Figure 5:
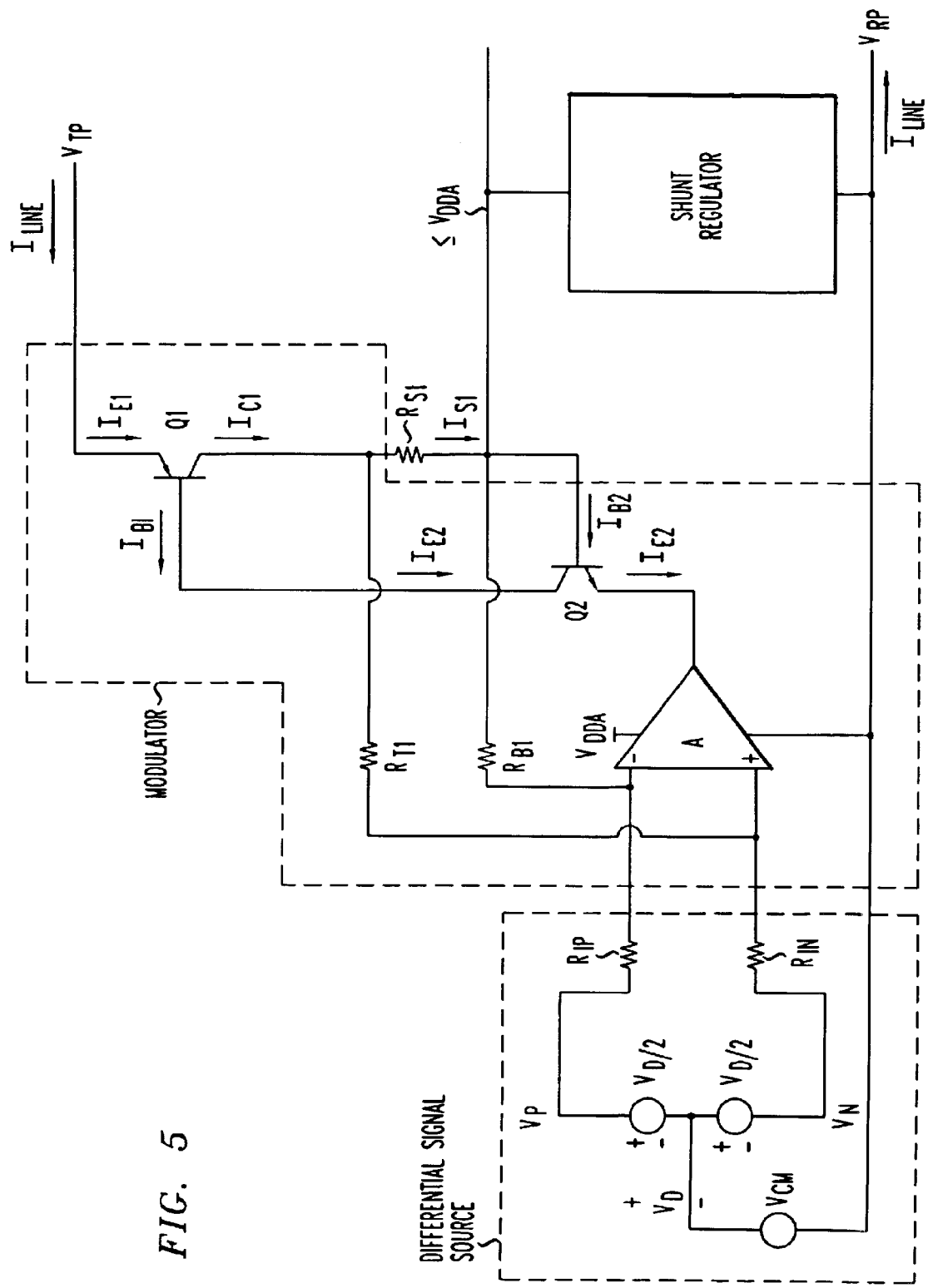
FIG. 5 is a circuit diagram of an alternative data access arrangement (DAA) in accordance with known art.
Figure 6:
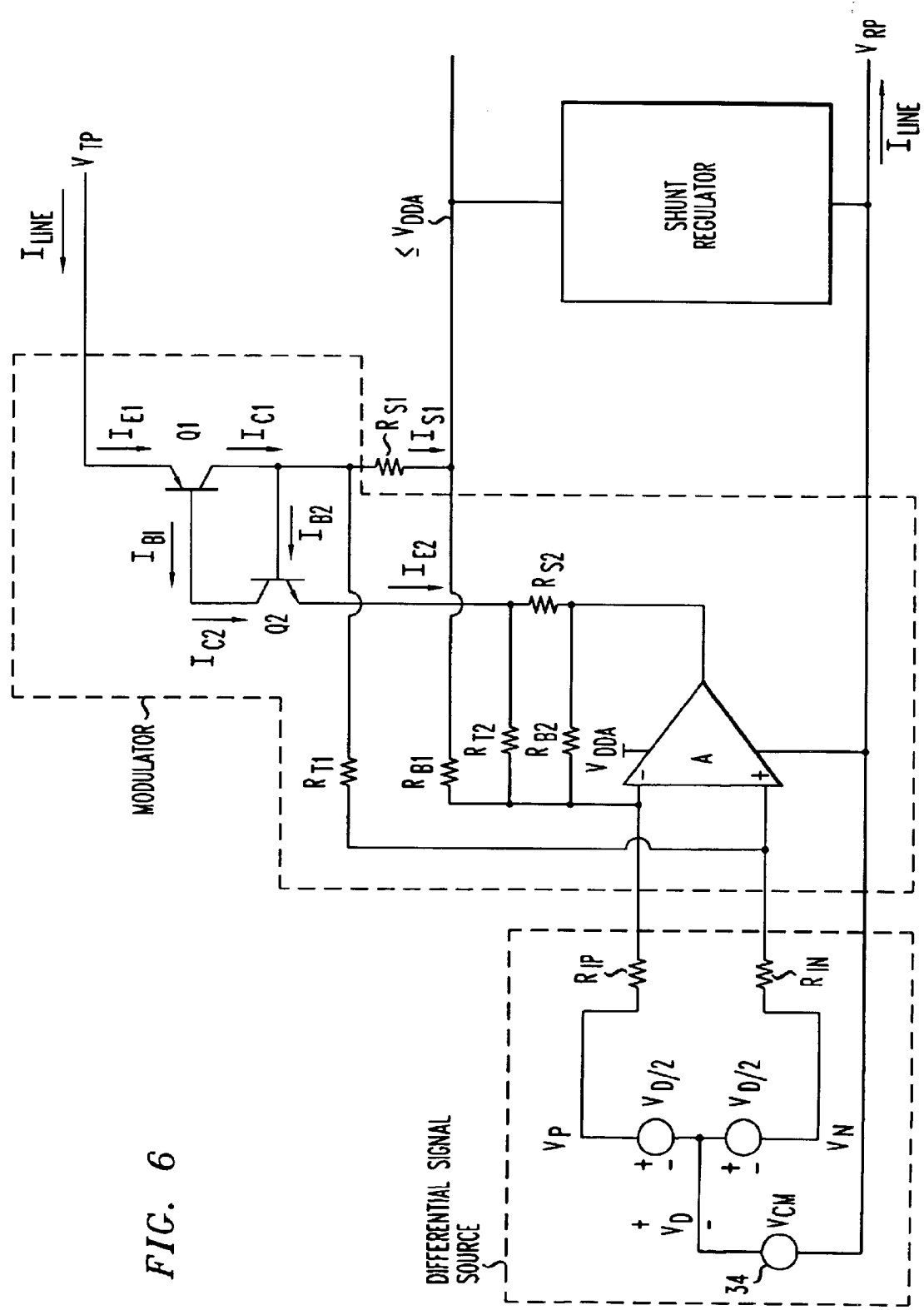
FIG. 6 is a circuit diagram of an alternative data access arrangement (DAA) in accordance with known art.

FIG. 2 illustrates an exemplary circuit diagram of the telephone line interface 10 of FIG. 1. The current sense resistor 12 can be formed of a resistor Rs, and the illustrated line modulator 16 can be formed of a bipolar transistor Q2. The differential feedback block 20 includes a resistor 17 and a resistor 19. The resistors 17 and 19 are connected between the resistor Rs and the differential to single end converter 22. The differential signal source 23 includes a common mode voltage source 34, voltage adders 35 and 37, and resistors 26 and 28, The differential to single end converter 22 includes an amplifier 24 and a transistor Q1.

In a preferred embodiment of the invention, as depicted in FIG. 2, the output of the differential to single end converter 22 is electrically connected to the base of transistor Q2, the collector of transistor Q2 is electrically connected to the shunt regulator 14, and the emitter of transistor Q2 is electrically connected to the telephone line 18.

In operation, the differential signal source 23 generates a differential signal based upon the information signal 31 generated at the common mode voltage source 34. The common mode voltage source generates the information signal 31 which is output to voltage adders 35, 37. Adder 35 generates an output signal 30 by adding half of a information signal voltage 31 to the common mode voltage 34. Adder 37 generates an output signal 32 by subtracting half of the information signal 31 from common mode voltage 34. These differential signals 30 and 32, then drive the input resistors 26 and 28, respectively, to provide a differential signal input current into the amplifier 24. The generation of the differential signal currents can be made by other means which are well known in the art, and thus will not be further discussed.

The differential feedback block 20 generates a differential signal responsive to the current on telephone line 11. For instance, resistors 17 and 19 sense the differential voltage across sense resistor Rs. By setting the resistance of resistor 17 equal to the resistance of resistor 19, the current through resistors 17 and 19 will accurately model the current through resistor Rs. In a preferred embodiment, the resistance of resistors 17 and 19 is several hundred thousand ohms, while the resistance of the sense resistor Rs is approximately 10–20 ohms. Because of the relatively large resistance of resistor 17 and 19, the current through these resistors can be neglected in the circuit analysis. The sense resistor Rs in block 12 is used in a feedback loop by the control amplifier 24. By monitoring the current through sense resistor 12 with a feedback loop, the amplifier 24 can compensate for distortion in the line interface 10.

The differential to single end converter 22 then combines the information signal from the differential signal source 23 with the differential feedback signals from feedback block 20 to form a single ended modulator control signal 41. The modulator control signal 41 controls the modulator in response to the information signal 31 from source 23 and in response to the current flowing through sense resistor Rs. In particular, resistors 17 and 19 sense the differential voltage across sense resistor Rs. By setting resistor 17 equal to resistor 19 the current through resistor 17 into the input 27 of control amplifier 24, and the current through resistor 19 into the input 29 of control amplifier 24, accurately models the currents through sense resistor Rs. This approximately models $I_{LINE}$, the incoming current supplied by the telephone company. The feedback action of the loop comprising amplifier 24, transistor Q1, and differential feedback block 20 adjusts the current through resistor Rs such that the current through resistor 17 equals the current from the differential signal source 23 through resistor 28, and the current through resistor 19 equals the current from the differential signal source 23 through resistor 26.

The line modulator control signal 41 can be connected to the base of transistor Q2 in line modulator 16. The line modulator control signal 41 causes the line modulator to adjust the AC modulation and DC termination characteristics presented to the telephone line by the telephone line interface 10. In particular, the line modulator control signal 41 adjusts base current of Q2 which in turn adjusts the current returning to the telephone company through the collector-emitter path of Q2 to the telephone line 18.

In the configuration illustrated in FIG. 2, telephone line current $I_{Line}$ is introduced to the telephone line interface 10 through the sense resistor Rs. The current exiting the sense resistor Rs then equals the telephone line current minus current flowing through resistors 17, 19. Preferably, resistors 17 and 19 are sufficiently large to make any current flowing through resistors 17 and 19 negligible. For instance, the resistance of resistors 17 and 19 is several hundred thousand ohms, while the resistance of resistor Rs is approximately 10–20 ohms. Accordingly, the current exiting resistor Rs approximately equals the current $I_{Line}$ entering resistor Rs.

The leakage current potentially resulting in distortion in the telephone line interface 10 occur at transistors Q1 and Q2. However, the emitter to base leakage current $I_{B1}$ from transistor Q1 travels back to the telephone line return 18. In particular, leakage current $I_{B1}$ flows through the common ground $V_{Return}$ connection between amplifier 24 and shunt regulator 14, and then through transistor Q2 to telephone line return 18. Furthermore, the base to emitter leakage current on transistor Q2 also travels back to the telephone line return 18. Accordingly, the potential distortion caused by the leakage currents through transistors Q1 and Q2 are substantially eliminated because the leakage currents travel back to the telephone line return 18.

This preferred arrangement results in a circuit which is virtually free from distortion. Substantially all of the current of $I_{Line}$ entering at telephone line 11 passes through sense resistor Rs and is returned to $I_{Line}$ at telephone line 18. The only error is a function of the current through resistors 17 and 19. Due to the substantial difference in resistance between resistor Rs and the resistors 17 and 19, the current through resistors 17 and 19 is negligible and can be ignored. Accordingly, the telephone line interface 10 exhibits low distortion because the sense resistor Rs senses substantially all of the current and its associated distortion through the line interface 10, allowing the amplifier 24 to control $I_{LINE}$ by incorporating most of $I_{LINE}$ into the feedback path and compensating for the associated distortion. Additionally, in the preferred embodiment of FIG. 2, both transistor Q1 and transistor Q2 operate in a current gain configuration to enhance open loop gain of Differential to Single End Converter 22.

To facilitate discussion, bipolar junction transistors (BJTs) are shown in the FIG. 2 and used to describe the preferred embodiments. However, the present invention may incorporate bipolar junction transistors (BJTs), field effect transistors (FETs), or a combination of BJTs and FETs. Therefore, the terminology used in the claims will be as follows: the base in a BJT and the gate in a FET will be referred to as the control terminal of the transistor, and the collector-emitter terminals of a BJT and the drain-source terminals of a FET will be referred to as the current flow terminals of the transistor.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and of the invention. Accordingly, the foregoing description is by way of example only, and is not limiting.

What is claimed is:

1. A telephone line interface for placing an information signal on a telephone line comprising:
   a shunt regulator that draws current from the telephone line
   a sense resistor for sensing the current draw from the telephone line, and
   a line modulator for modulating the telephone line as a function of the information signal, the line modulator being in series with the sense resistor and the shunt regulator such that the shunt regulator is operably coupled between the sense resistor and the line modulator.

2. The telephone line interface according to claim 1, wherein the line modulator is a bipolar transistor.

3. The telephone line interface according to claim 2, wherein the emitter of the bipolar transistor is operably coupled to the telephone line.

4. The telephone line interface according to claim 2, wherein the collector of the bipolar transistor is operably coupled to the shunt regulator.

5. The telephone line interface according to claim 1, wherein the telephone line interface is a data access arrangement for a modem.

6. The telephone line interface according to claim 1, further comprising a feedback path from the sense resistor to the line modulator.

7. The telephone line interface according to claim 6, wherein the feedback path is a differential feedback path.

8. The telephone line interface according to claim 6, wherein the feedback path includes a differential to single end converter that generates a control signal for controlling current flow through the line modulator.

9. The telephone line interface according to claim 1, further including input terminals for receiving the information signal.

10. The telephone line interface according to claim 1, wherein the line modulator controls current flow on the telephone line in response to the information signal and in response to the current flowing through the sense resistor.

11. A telephone line interface circuit for placing an information signal on a telephone line comprising:
    means for drawing current from a telephone line,
    means for sensing the current draw from the telephone line, and
    means for modulating the telephone line as a function of the information signal, the modulating means being in series with the means for sensing noise and the means for drawing current, the means for drawing current being operably coupled between the means for sensing current and the means for modulating the telephone line.

12. The telephone line interface according to claim 11, wherein the modulating means controls current flow on the telephone line in response to the information signal and in response to the sensed current draw from the telephone line.

13. The telephone line interface according to claim 11, wherein the modulating means is a bipolar transistor.

14. The telephone line interface according to claim 11, further comprising means for feeding back the sensed amount of current to the means for modulating the telephone line.

15. A method of placing an information signal on a telephone line, the method comprising:
    sensing the current draw from the telephone line with a sense resistor,
    drawing current from the telephone line, and through the sense resistor, with a shunt regulator, and
    modulating the output signal from the shunt regulator based on the information signal.

16. The method according to claim 15, wherein the sensing step further comprises sensing the current draw with a differential feedback path.

17. The method according to claim 16, further comprising the step of converting the differential signal to a single end control signal for controlling the modulation of the output current from the shunt regulator.

18. The method according to claim 16, further comprising the step of combining the differential feedback path from the sense resistor with the information signal.

19. The method according to claim 15, further comprising the step of modulating the output signal from the shunt regulator based on the information signal and based upon the sensed current draw from the telephone line.

* * * * *